US005088174A

United States Patent [19]

Hull et al.

[11] Patent Number: 5,088,174

[45] Date of Patent: Feb. 18, 1992

[54] FORCIBLE ENTRY TOOL

[76] Inventors: Harold L. Hull, 401 Canyon Way, SP.43, Sparks, Nev. 89434; Patrick N. Dowden, 9400 Forest Vista Way, Elk Grove, Calif. 95758

[21] Appl. No.: 653,167

[22] Filed: Feb. 11, 1991

[51] Int. Cl.[5] .......... B23P 19/04

[52] U.S. Cl. .......... 29/254; 81/463; 29/275; 29/278

[58] Field of Search .......... 29/254, 270, 275, 278; 81/180.1, 463; 16/111 R, 116 R; 173/90, 91, 162.2

[56] References Cited

U.S. PATENT DOCUMENTS

| | | | |
|---|---|---|---|
| 10,330 | 5/1870 | Heusser . | |
| 116,534 | 7/1871 | Hamilton | 254/118 |
| 344,653 | 6/1886 | Harmon . | |
| 840,580 | 1/1907 | McMillan . | |
| 1,958,329 | 5/1934 | Beard | 29/254 |
| 1,972,197 | 9/1934 | Jones | 306/2 |
| 2,466,845 | 4/1949 | Ghee et al. | 29/254 |
| 2,490,684 | 12/1949 | Gosselin | 81/463 |
| 2,754,585 | 7/1956 | Green | 81/463 |
| 2,981,484 | 4/1961 | Hirsch | 16/116 R |
| 3,219,316 | 5/1964 | Fried | 254/131 |
| 3,227,455 | 1/1966 | Hulsman | 16/111 R |
| 3,348,870 | 10/1967 | Zern | 294/3.6 |
| 3,710,407 | 1/1973 | Reid | 7/8.1 |
| 3,712,389 | 1/1973 | Smoak | 173/90 |
| 3,762,022 | 10/1973 | Jeune | 29/254 |
| 4,201,368 | 5/1980 | Vetter | 254/131 |
| 4,211,446 | 7/1980 | Shultz | 294/26 |
| 4,280,540 | 7/1981 | Meacham | 173/91 |
| 4,362,194 | 12/1982 | Lawson | 173/91 |

*Primary Examiner*—J. J. Hartman

[57] ABSTRACT

A forcible entry tool is disclosed which enables law enforcement personnel such as SWAT or police or other persons such as firemen to breach a heavily fortified door or the like in a matter of seconds without the use of explosives. A ram like device is taught which is normally operated by two persons which can penetrate through a steel re-enforced door by using a heavy-duty slide hammer with a leg support that is locked to the correct height for support when a pin is pulled. The apparatus also has a hook on one end which may be impaled in the door or hooked to any other object and the door or object removed outwardly.

17 Claims, 3 Drawing Sheets 10
12
14
16
18
20
22
23
24
26
27
28
29
30
31
32
33
34
35
36
37
40
42
44
46
48
50

Fig 11
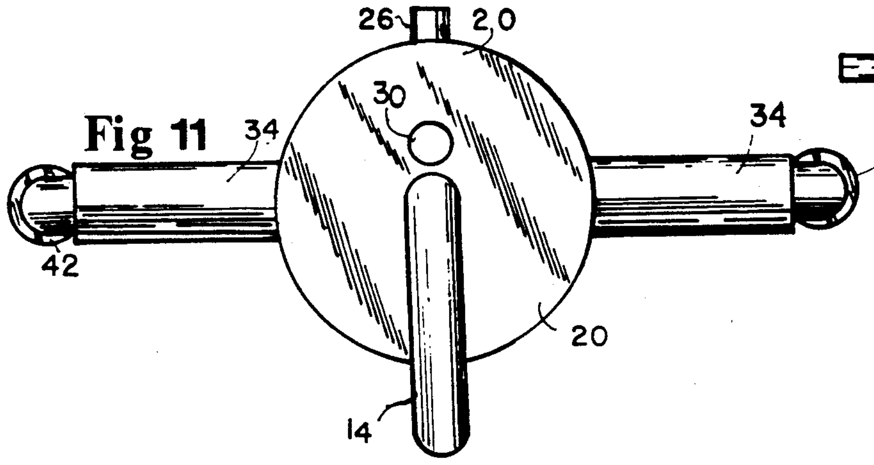
Fig 12
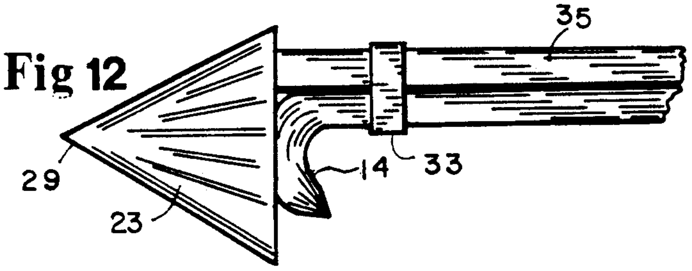
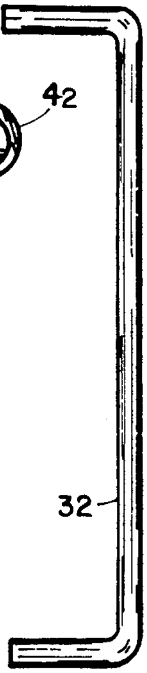
Fig 20
Fig 13
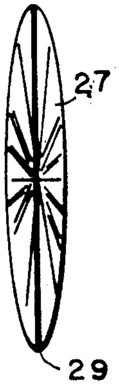
Fig 14
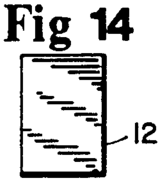
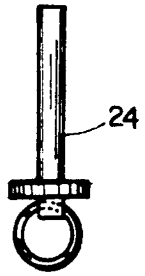
Fig 19
Fig 15
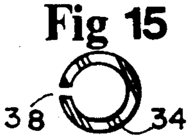
Fig 16
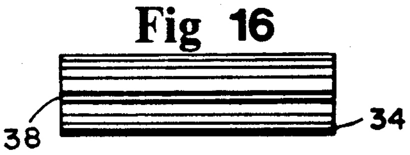
Fig 17
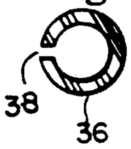
Fig 18
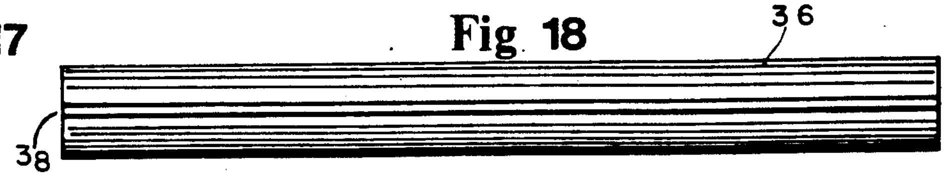

FORCIBLE ENTRY TOOL

FIELD OF THE INVENTION

This invention relates to forcible entry tools and more particularly to a tool used by law enforcement personnel in breaking open re-enforced doors or the like.

BACKGROUND OF THE INVENTION

Forcible entry tools are often used for performing various cutting and prying operations at fires, wrecks, etc., and are well documented in prior art such as the forcible entry tool of U.S. Pat. No. 3,219,316 which is carried by a single person and is designed to be a multi-purpose tool. Also a number of tools exist which teach combination tools designed to open vehicle doors such as U.S. Pat. No. 4,201,368 and U.S. Pat. No. 3,710,407 which again are designed to be used by one person.

Nail pullers, box openers and seal pullers, etc., also teach the use of a sliding member to "hammer" on a contact member to loosen or knock loose some elements, however, these tools are generally designed for some specific task and are used as a tool by one person.

The problems encountered by the use of such tools are numerous when trying to use such tools under a high stress situation where time is of the essence and immediate entry is required as occurs many times, especially in the law enforcement arena.

The present invention addresses these and other problems encountered by law-enforcement personnel which the prior art has not addressed in a satisfactory manner.

With the continuing escalation of gangs/drugs and the heavy incidence of armed suspects involved in the service of high risks warrants, hostage rescue, barricaded gunman with hardened and fortified entry points etc., many varied types of entry means have been used such as explosives, powered metal cutting tools, or sophisticated "burning" devices, however, each of these devices has it's own inherent problems such as noise, time-delays, fire hazard, etc., and are dangerous to the users and are expensive.

This type of situation has created a need for a simple, no-nonsense, reliable, durable, breaching device which can breach heavily fortified doors or the like in a matter of seconds which will afford the users such as SWAT teams and other law enforcement agencies, dependability, mobility and speed in the first critical seconds where the danger potential is extreme and suspect neutralization is critical.

SUMMARY OF THE INVENTION

It is therefore a primary object of the present invention to provide a device especially useful in opening fortified entry points such as doors and especially doors which swing outwardly that have been re-enforced with metal.

A further object is to provide a heavy-duty device which is adapted to be used by two persons to give instant access.

Still another object is to provide on one of the extremities of the device a structure which is substantially a U shaped pronged hook which is capable of penetrating and hooking a fortified structure such as a door or metal re-enforced screen.

Another important object is to provide a shaft or rod extending rearwardly from the U shaped hooked prong.

A further object is to provide substantially a ring on the distal end of the shaft from the pronged hook.

Yet another object is to provide an elongated, substantially square, tubular member which covers the shaft or rod.

Another object is to provide a second elongated, substantially square, tubular member adapted to reciprocate on the first square tubular member.

Yet another object is to provide stops or bulkheads suitable attached by means such as welding to the first tubular member and the rod or shaft, which cooperates with the second tubular member to provide a positive stop for the second reciprocal slide member whereby the impact from the slide member will be transferred to the hooked prong and subsequently to the fortified object.

Still another object is to build the second slide member of a heavy material such as steel metal square tubing which has sufficient weight to provide a substantial impact to cause expeditious opening of the fortified entry point once the pronged hook has been impaled into the fortified object.

Another object is to provide handles on the slide member which are hand friendly whereby at least two persons can comfortably manipulate, use and control the device.

Yet another object is to provide a handle cover made of a material such as hard rubber which can be held in a tensioned position in substantially the center portion of the handle by springs with the springs being held in place by a washer and cotter pin.

Another object is to provide means such as a pin to lock the second square tubular slide member to the first square tubular structure for transporting the device and to hold the unit together when impaling the pronged hook into the fortified object.

Still another object is to provide means to add and hold an additional member to the slide member to provide additional weight if desired.

Yet another important object is to provide an additional add-on entry head which may be used in conjunction with the hooked prong, which is substantially an arrow shaped attachment with sharpened edges and made of a substance such as tempered steel or titanium or the like in the form of a casting which allows the device to be used as a "ram." The "arrow" head cooperates with the hooked prong in such a manner that when the "arrow" head has penetrated the object by the ram effect and by multiple hammer blows of the device, the hook is released from the "arrow" head and now hooks the object so the operators can now hammer backwards or forward to dislodge the door or object.

Another object is to provide on the distal end opposite the hook end, a pivotably mounted, leg support with it's opposite end being released when the locking pin which locks the second slide member to the first tubular member, is pulled. This leg support can be made telescopic and self locking, so that the leg support drops down and supports the device at the same height as the penetrating end, thus allowing the operators to concentrate on the horizontal slide hammer which requires all their energy.

Other objects and advantages will become apparent when taken into consideration with the following drawings and specifications:

BRIEF DESCRIPTION OF THE DRAWINGS

FIG. 11 is an end view of the hook end of FIG. 3 and 5.

FIG. 12 is a side view of the add-on entry head depicted in FIG. 2.

FIG. 13 is an end view of the entry head of FIG. 2 and 12.

FIG. 14 is an end view of the add-on weight of FIG. 4 and 9.

FIG. 15 is an end view of a handle cover.

FIG. 16 is a side view of a handle cover.

FIG. 17 is an end view of a handle cover.

FIG. 18 is a side view of a handle cover.

FIG. 19 is a side view of a pull pin.

FIG. 20 is a side view of a handle support bar.

DETAILED DESCRIPTION OF THE DRAWINGS

Figures 1, 2, 3, 4:
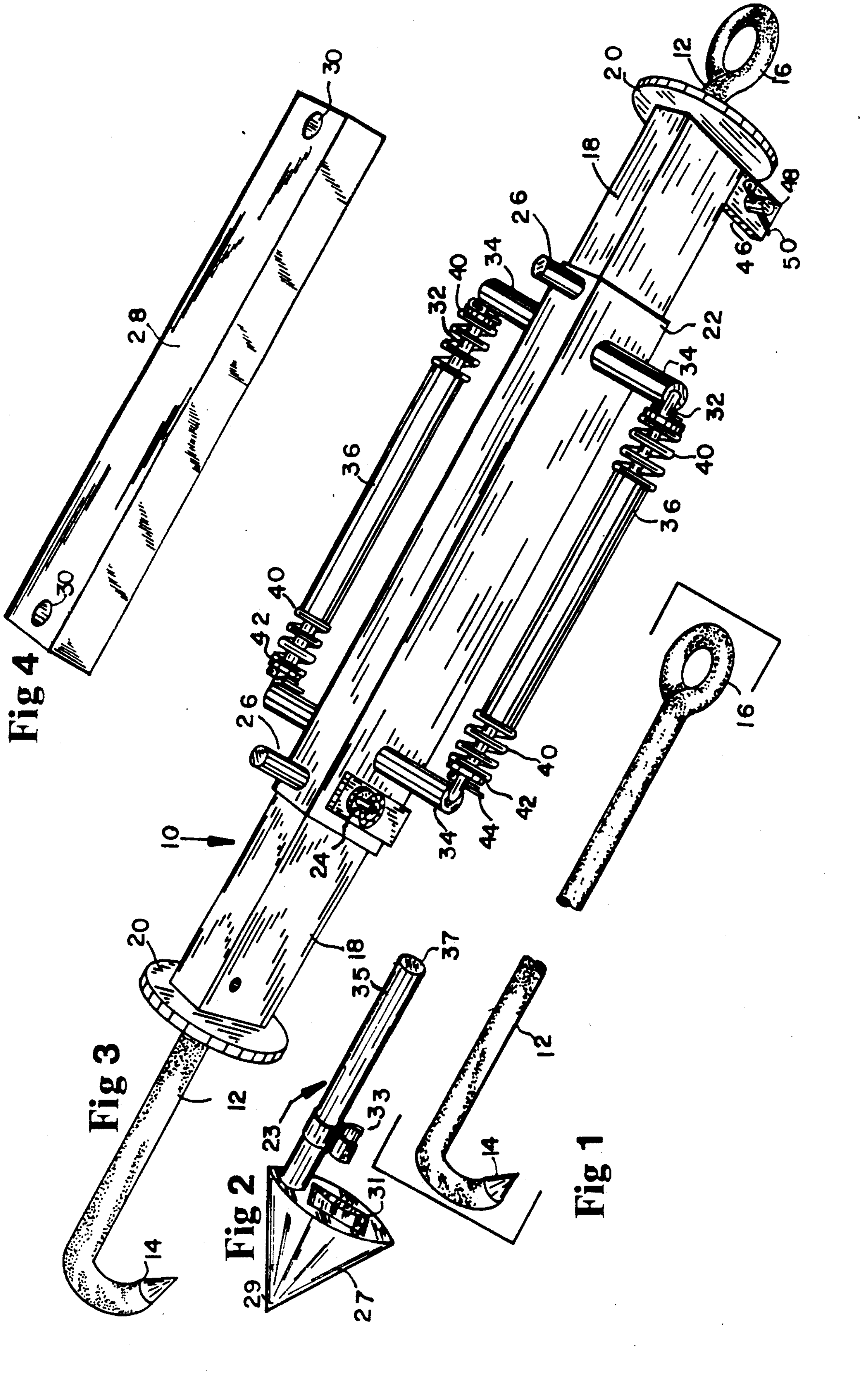
FIG. 1 is a perspective broken view of a shaft or rod which extends through the device from one end to the other.
FIG. 2 is a perspective view of an optional add-on entry head.
FIG. 3 is a perspective view of the device.
FIG. 4 is a perspective view of an add-on weight.
Figure 5:
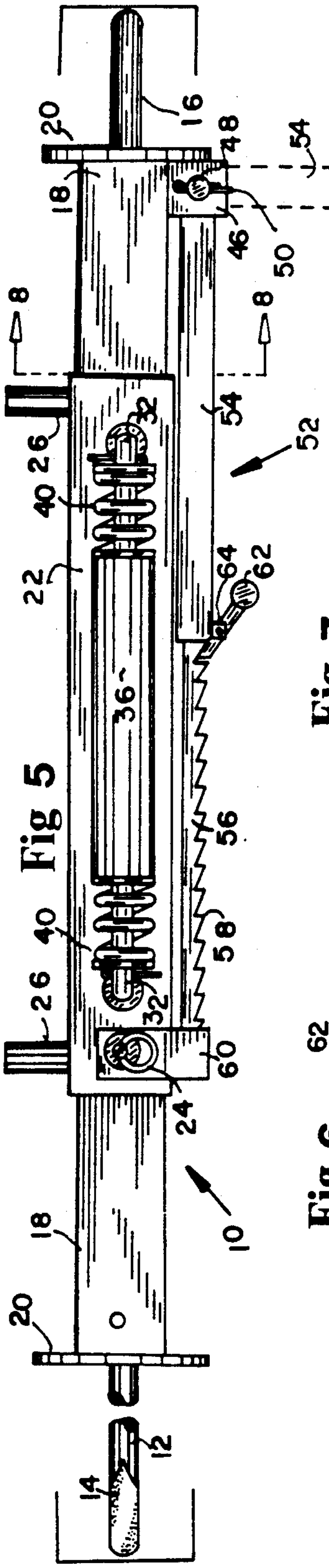
FIG. 5 is a side view of the device.
Figure 6:
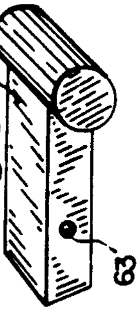
FIG. 6 is a perspective view of a weight activated locking device.
Figure 7:
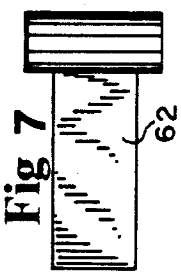
FIG. 7 is a top view of FIG. 6.
Figure 8:
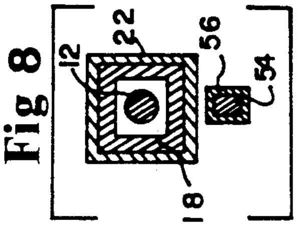
FIG. 8 is a sectional view taken at 8—8 of FIG. 5.
Figure 9:
FIG. 9 is a side view of the add-on weight of FIG. 4.
Figure 10:
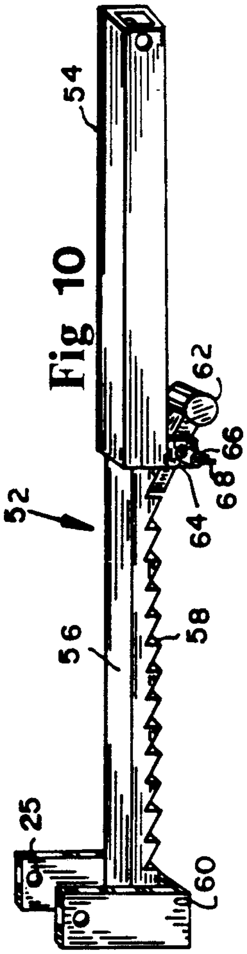
FIG. 10 is a perspective view of a telescoping self-locking leg support.

Referring now in detail to the drawings, wherein like characters refer to like parts throughout the various drawings, in FIG. 3 and 5, 10 is a forcible entry tool with 12 being a shaft or rod made of a high quality material such as hardened steel with a substantially U shaped pronged hook 14 formed in one end and substantially a ring 16 formed on the opposite distal end, with 18 being a substantially square tubular member to support bulkheads 20, bulkheads 20 being suitably affixed by means such as welding to tubular member 18 and shaft 12, with tubular member also acting as a support member and guide for a substantially square tubular slide member 22, slide member 22 being releaseably affixed to tubular member 20 by pull pin assembly 24 through aligned holes (not shown) in member 20 and slide member 22.

26 are support pins affixed to slide member 22 to releasably hold and retain add-on weight member 28, weight member 28 being a substantially rectangular bar of heavy material such as cast iron containing holes 30 which cooperate with support pins 26, while 32 are substantially U shaped supports made from suitable material such as steel shafts which are suitable affixed my means such as welding to slide element 22, with 34 and 36, respectively, being handle covers made of a material which is hand friendly, yet firm such as hard rubber, and can be assembled on handle supports 32 by means of slits 38, with handle supports 32 also supporting springs 40, washers 42 and cotter pins 44.

Member 18 also supports mounting brackets 46 which are suitably affixed by means such as welding to member 18 and pivotably supports the leg member 52 by means of pin 48 and cotter pin 50 and is made up of a substantially square tubular member 54 and telescopic member 56 which contains teeth 58, with member 56 having at it's open end a substantially U shaped bracket 60 which holds leg member 52 in a secured first position by pull pin 24 through holes 25 to slide member 22. When pull pin 24 is removed, leg member 52 drops to a second position and extends to a proper length to reach a ground support such as a floor (not shown) and is locked in place by a weight activated locking member 62, member 62 being pivotably mounted through hole 63 to mounting bracket 64 by pin 66 and cotter pin 68.

It will now be seen that we have provided a device that can be fabricated from a material such as steel and welded together to form a forcible entry tool that can be handled by two operators and can be used as a ram by placing the arrow attachment 23 over the hook 14 and held in place by clip 33 by frictional engagement of clip prongs with the outer surface of the hook 14 as seen in FIG. 2, or can be used as a slide hammer by piercing an object such as a door or impaling the hook in the door and, by slamming the slidable member 22 against one of the bulkheads 20, cause a forcible entry.

It will also be noted that we have provided a ring on one end of the device to which a hook and cable (not shown) may be attached for additional pulling power.

Also we have provided a versatile leg support which drops down and locks.

We have also provided spring cushions on the handles to eliminate undue shock to the hands of the operators.

Also we have provided an extra weight and means to hold it on the slide hammer when it is needed.

Although the invention has been shown and described in what is conceived to be the most practical and preferred embodiment, it is recognized that departures may be made therefrom within the scope and spirit of the invention, which is not to be limited to the details disclosed herein but is to be accorded the full scope of the claims so as to embrace any and all equivalent devices and apparatus.

Having described our invention, what we claim as new and desire to secure by letters patent is:

1. A forcible entry tool comprising; an elongated substantially square, tubular first member, said first member having a bulkhead secured to each end of said first member, said first member and said bulkheads supporting a shaft, said shaft piercing and being secured to said bulkheads substantially at center sections of the bulkheads, said shaft extending through and beyond each end of said first member, said shaft having a first end including a substantially pronged hook, said tool further having a weight means comprising an elongated substantially square tubular second member, said second member being of a lesser length than said first member, said second member being of a larger circumference than said first member, said first member and said second member having a slidable relationship, said slidably relationship being between and limited by said bulkheads, said tool including locking means to releaseably lock said second member to said first member, said second member having handle means, whereby, when said hook is impaled into an object to be forcibly removed, said second member may be forcibly moved on said first member to forcibly strike one of said bulkheads with a hammer blow, said hammer blow transferring kinetic energy to said hook and said object to be forcibly removed, said tool further including a support leg, means to pivotally mount one end of said support leg to said first member adjacent a second end of said shaft, wherein said support leg includes releasable retaining means to retain said leg to said first square tubular member, said releasable retaining means being located on an end of the support leg opposite the pivotable mounting means.

2. The device of claim 1 in which said second end of said shaft includes a ring.

3. The device of claim 1 in which said locking means is a pin.

4. The device of claim 1 in which said handle means is a substantially U shaped steel shaft.

5. The device of claim 1 including an additional weight member and means to removably affix said weight member to said second slide member.

6. The device of claim 5 in which said means to affix said weight member to said second slide member includes at least two pins, each of said pins being affixed at one end to said second slide member and said pins cooperating with at least two holes in said weight member.

7. The device of claim 5 in which said additional weight member is made of cast iron.

8. The device of claim 4 in which said handle has a covering.

9. The device of claim 8 in which said covering is made of hard rubber, said covering having a slit along an outer edge, wherein, said hard rubber cover may be mounted on said U shaped shaft.

10. The device of claim 8 in which said U shaped shaft has at least two springs mounted on one leg of said U shaped shaft, said springs being separated by said covering, said springs being retained in a tensioned relationship with said covering by a keeper, said keeper being a washer and cotter pin.

11. The device of claim 1 in which said support leg is telescopic.

12. The device of claim 1 including means to lock said telescopic support leg in multiple positions.

13. The device of claim 12 in which means to lock said telescopic support leg in multiple positions is by teeth, said telescopic leg.

14. The device of claim 1 in which said releasable retaining means is a substantially U shaped bracket, said bracket cooperating with said locking means to releaseably lock said second member to said first member.

15. The device of claim 1 including a substantially arrow shaped head, said head having attaching means to attach said head to said hook and said shaft.

16. The device of claim 15 in which said arrow shaped head is a casting, said casting being made of steel.

17. The device of claim 15 in which said attaching means is a clip.

* * * * *